Aug. 5, 1952     F. P. HOLMGREN     2,605,572

FISHING LURE

Filed June 2, 1949

Inventor
FRED PHILIP HOLMGREN
By Joshua R. H. Potts
His Attorney

Patented Aug. 5, 1952

2,605,572

UNITED STATES PATENT OFFICE 2,605,572

FISHING LURE

Fred Philip Holmgren, Chicago, Ill.

Application June 2, 1949, Serial No. 96,776

5 Claims. (Cl. 43—42.3)

The present invention relates to a fish lure and is concerned primarily with a lure which simulates a frog.

At the present time, there are available to the public fish lures which have the general appearance characteristics of a frog.

The present invention deals with certain novel structural features of a lure of this type which present advantages from the viewpoint of ease of manufacture and assembly, and also in the close simulation of a natural frog and the movements of such a frog in the water.

The present invention has in view as its foremost objective the provision of a fishing lure in the form of a frog which comprises three main sections. These are: the body and the two legs. In accordance with the present invention, the body is of a split two-part construction which permits of its assembly in such a manner as to secure therein means for attaching the legs thereto. Each of the legs is of a two-part construction which facilitates anchoring the securing element which attaches the same to the body thereto and also the fish hook.

Another somewhat more detailed object of the invention is to provide, in a fish lure of the type indicated, a frog body consisting of two complemental halves. One of these halves is hollowed out to provide a recess or chamber which imparts the required buoyancy to the body. One of these halves is also formed with a V-shaped groove that is adapted to receive a V-shaped fastening element. After this fastening element is secured in position, the two halves of the body are cemented together to finish the body construction.

Another object of the invention is to provide in a fish lure of the frog type, a pair of legs, each of which consists of two complemental halves which are hollowed out to provide recesses which together define chambers in the finished leg. Secured between the halves of each leg at one end is a fastening element which cooperates with the fastening element that is anchored in the body. Secured between the halves at the other end is the shank of a fish hook. The halves of each leg are assembled about the fastening member and hook shank, respectively, whereupon they are cemented together.

Still another object of the invention is to provide, in a fish lure of the frog type, a joint between each leg and the body which permits free movement of the leg relative thereto. This joint preferably takes the form of interlinking eyes formed on the fastening members which are secured to the respective parts.

Another object of the invention is to provide, in a fish lure of the character aforesaid, a body which is made from a plastic or similar material and which is provided at the head end with a metallic downwardly extending lip. Immediately over this body, the tip of the head is provided with means for attaching a line thereto. When a lure having a body of this type is pulled through the water by the line, the lip imparts a bobbing action thereto which is believed to be particularly attractive to certain types of fish.

Various other more detailed objects and advantages of the invention such as arise in connection with carrying out the above noted ideas in a practical embodiment will, in part become apparent, and in part be hereinafter stated as the description of the invention proceeds.

The invention, therefore, comprises a fish lure in the form of a frog consisting of three main parts; namely, a body and two legs. The body is of a split two-part construction that is assembled about a V-shaped fastening member which provides one element of each of the leg connections. Each of the legs is also of a split two-part construction that is assembled about a fastening member at one end that is linked to the V-shaped fastening member carried by the body and about the shank of a fish hook at the other end. The complemental halves of the body and legs are cemented together, after which these parts may be colored in a manner resembling a frog's natural coloring and covered with a lacquer to give the finished appearance.

For a full and more complete understanding of the invention, reference may be had to the following description and accompanying drawing wherein.

Figure 1:
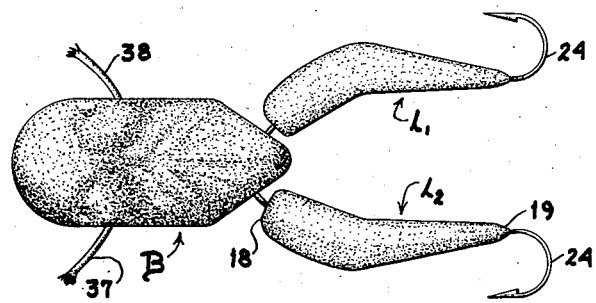
Figure 1 is a top plan view of a fish lure that is designed and constructed in accordance with the precepts of this invention.
Figure 2:
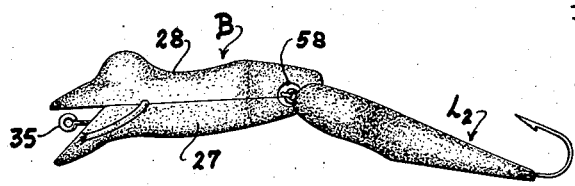
Figure 2 is a view in side elevation of the lure shown in Figure 1.

Referring now to the drawing wherein like reference characters denote corresponding parts, and first more particularly to Figures 1 and 2, the fish lure of this invention is shown as being constructed to resemble a frog. This lure comprises a body B and two legs L1 and L2. These legs L1 and L2 are of substantially identical construction and only one of them is herein described in detail for the purposes of this specification.

Figure 3:
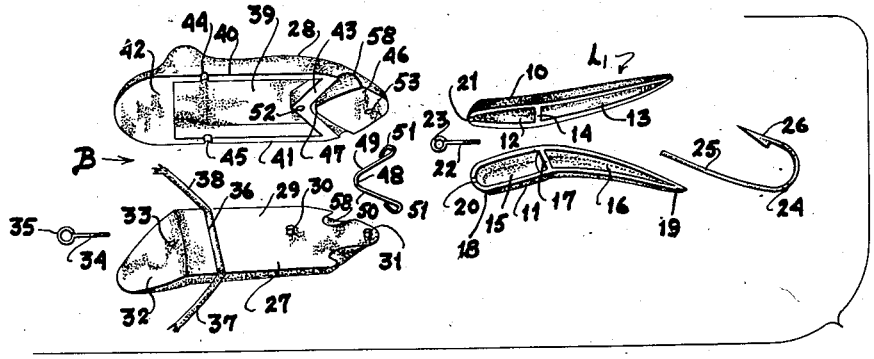
Figure 3 is a perspective view developing the several parts of the lure in exploded relation.

Upon referring to Figure 3, it will be noted that the leg L1 comprises two complemental halves 10 and 11. These halves may be made from any appropriate material, although the invention has particularly in mind the use of a plastic which may be molded into the desired shape. Plastics having the desired characteristics are now well known and valuable to the public as such.

The leg half 10 is hollowed out to provide recesses 12 and 13 which are spaced apart by a rib 14. Likewise, the leg half 11 is formed with a recess 15 which corresponds to the recess 12 and another recess 16 corresponds to the recess 13. These recesses 15 and 16 are separated by a rib 17 which corresponds to the rib 14.

Each of the legs L1 and L2 has a front end such as represented at 18 and a tail end at 19. The edge of the leg half 11, which defines the recess 15 and particularly that portion of the edge located at the end 18, is formed with a small notch 20 which cooperates with a similar notch 21 formed in the corresponding location in the leg half 10 to define an opening which receives a fastening member 22 having an eye 23 at its free end.

A fish hook is shown at 24 and has a shank 25 and a barb 26. The shank 25 is secured between the leg halves 10 and 11 at the end 19.

It is believed that the manner of assembling each of the legs L1 and L2 is obvious from the description given. The fastening member 22 is placed in position in either the notches 20 and 21 and the shank 25 between the halves 10 and 11 at the end 19. The meeting edges of these halves 10 and 11 are now treated with cement and they are clamped together to securely anchor the fastening member 22 and hook 24 in position. In this position, the recesses 12 and 15 cooperate as do the recesses 13 and 16 to provide chambers which lend buoyancy to the completed leg structure.

A coat of lacquer may be applied as the final step in the assembly of the legs. If desired, this final step may be preceded by the application of a coloring or a spotted coat to closely resemble the coloring of a live frog.

The body B is shown as comprising a bottom half 27 and a top half 28. These halves 27 and 28 are also made from an appropriate plastic. The bottom half 27 is formed with a flat face 29 from which projects a pair of fastening pins 30 and 31. At the forward or head end of the frog, the body half 27 is formed with a downwardly directed lip construction 32. This lip 32 is provided with an opening at 33 for receiving the threaded shank 34 of an eye screw 35. The latter is employed in anchoring a fish line to the lure. Also secured to the bottom half 27, in any preferred manner such as by an adhesive, is a cross cord 36 presenting flexible extremities 37 and 38 which are movable in the water as an incident to the lure being pulled therethrough.

The top half 28 is hollowed out to provide a central recess 39 that is closed by the flat face 29 when the body halves are assembled to provide a chamber. This recess 39 is defined by side walls 40 and 41, a solid section 42 at the head end, and a V-shaped wall structure 43 at the tail end. The solid section 42 presents a flat face opposite to the lip 32 in close resemblance of the open mouth of a frog. The side walls 40 and 41 are formed with notches at 44 and 45 which accommodate the cord 36.

Spaced from the V-shaped wall 43 is a solid tail portion 46 and the spacing of these two elements provides a V-shaped groove 47. Positioned in this groove 47 is a V-shaped fastening member 48 having legs 49 and 50, each of which carries an eye 51 at its free end. Each eye 51 is interlinked with the eye 23 of the fastening member 22 on the respective leg L1 and L2. These eyes 51 are positioned in recesses 58 which are formed at the extremities of the slot 47.

The lower exposed edge of the wall 43 is formed with an opening 52 that receives the pin 30. Likewise, the flat bottom face of the solid tail section 46 is formed with an opening 53 which receives the pin 31.

The manner of assembling the body B is also believed to be obvious from the description given. The V-shaped fastening member 50 is positioned in the V-shaped groove 47 with the eyes 51 located in the recesses 58 in the side of the body. The cord 36 is also anchored to the flat face 29 in the manner illustrated, whereupon an appropriate cement is applied to the meeting faces of the body halves 27 and 28. These parts are now assembled with the pins 30 and 31 fitting in the openings 52 and 53. They are securely clamped together to permanently establish the assembled relation. A coat of lacquer may be applied as a final step or if desired, this lacquering may be preceded by the application of an appropriate coloring that may include the spots of a natural frog. The eye screw 35 may be screwed into the opening 33, either before or after assembly of the body halves.

It is evident that the frog above described is susceptible of mass production by the manufacture in that each of the body and leg parts may be molded or cast in to the formation illustrated. The finished product comprises a lure that closely resembles a live frog and which provides for movement of the legs relative to the body as the frog is drawn through the water. The depending lip at 32 also enters into the action of the frog during this operation and will impart a bubbling action thereto.

*Modification*

Figure 4:
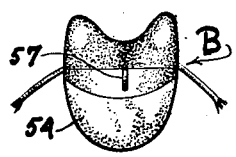
Figure 4 is a view in front end elevation of a modification.
Figure 5:
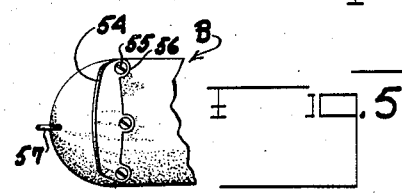
Figure 5 is a fragmentary bottom plan view of the lure shown in Figure 4.

Figures 4 and 5 illustrate a slightly modified form of construction at the head end of the frog. In this form, the downwardly extending lip 32 of the lure shown in Figures 1, 2 and 3 is replaced by a metallic lip 54 that is secured to the under face of the body B by screws 55 passing through openings formed in eyes 56 which extend from the lip 54. It will also be noted that an eye screw 57 is secured at the extreme forward end of the body B, rather than in spaced relation with respect thereto as shown in Figures 2 and 3.

The combination of this location of the anchorage for the line with the metallic lip 54 which adds weights at the point illustrated, results in imparting a bobbing action of the lure as it is pulled through the water.

While preferred specific embodiments of the invention are hereinbefore set forth, it is to be clearly understood that the invention is not to be limited to the exact constructions, proportions, and materials illustrated and described because the various modifications of these details may be provided in putting the invention into practice within the purview of the appended claims.

What is claimed is:

1. In a fishing lure of the frog type, a body comprising two complemental halves that are secured together, one of said halves being formed with a V-shaped groove therein, a V-shaped fastening member mounted in said groove and having a pair of eyes positioned exteriorly of and at opposite sides of said body, a pair of legs, and each of said legs having a fastening member mounted therein, said fastening member being formed with an eye at one end that is interlinked with one of the eyes of said V-shaped fastening member.

2. In a fishing lure of the frog type, a body comprising two complemental halves securely joined together, a fastening member clamped between said halves of said body and presenting a pair of eyes at the opposite sides thereof, a pair of legs, each consisting of two complemental halves that are secured together, a fastening member clamped between the halves of each leg at one end and interlinked with one of the eyes of the fastening member clamped between the halves of said body, and a hook having a shank clamped between the halves of each leg at the other end.

3. In a fishing lure of the frog type, a body comprising two complemental halves that are secured together, one of said halves being formed with a V-shaped groove, a V-shaped fastening member in said groove and having a pair of eyes positioned at opposite sides of said body, a pair of legs, each consisting of two complemental halves that are secured together, a fastening member clamped between the halves at each leg at one end and interlinked with one of the eyes of said V-shaped fastening member, and a hook having a shank clamped between the halves of each leg at the other end.

4. In a fishing lure of the frog type, a body comprising two complemental halves that are cemented together, one of said halves being formed with a recess therein defining an internal chamber, one of said halves being formed with a V-shaped groove therein terminating in a pocket at each side of said body, a V-shaped fastening member mounted in said groove, said fastening member having an eye at each end positioned in one of said pockets, a pair of legs, and a fastening member carried by each leg having an eye interlinked with one of the eyes of said V-shaped fastening member.

5. In a fishing lure of the frog type, a body comprising two complemental halves that are cemented together, one of said halves being formed with a recess defining an internal chamber, one of said halves being formed with a V-shaped groove terminating in a pocket at each side of said body, a V-shaped fastening member in said groove having an eye at each end positioned in one of said pockets, a pair of legs, each of which consists of two complemental halves cemented together, each of said halves being formed with a recess which cooperates with the corresponding recess in the other half to define a chamber, a fastening member at one end of each leg and having an eye which is interlinked with one of the eyes of said V-shaped fastening member, and a hook having a shank that is clamped between the halves of each leg at the end remote from that carrying the fastening member.

FRED PHILIP HOLMGREN.

REFERENCES CITED

The following references are of record in the file of this patent:

UNITED STATES PATENTS

| Number | Name | Date |
| --- | --- | --- |
| 159,325 | Hubbell | Feb. 2, 1875 |
| 810,017 | Ackerman | Jan. 16, 1906 |
| 1,136,482 | Parsons | Apr. 20, 1915 |
| 1,597,600 | Kallus | Aug. 24, 1926 |
| 1,833,522 | Globe | Nov. 24, 1931 |
| 1,849,434 | Page | Mar. 6, 1932 |
| 2,047,768 | Christiansen | July 14, 1936 |
| 2,159,230 | Sage | May 23, 1939 |
| 2,307,200 | Cullerton | Jan. 5, 1943 |
| 2,516,133 | Martin | July 25, 1950 |